(12) United States Patent
Tang

(10) Patent No.: US 8,422,486 B2
(45) Date of Patent: Apr. 16, 2013

(54) METHOD FOR CONTROLLING DIRECT PENETRATING COMMUNICATION BETWEEN TWO DEVICES UNDER DIFFERENT NATS, AND DEVICE FOR THE SAME

(75) Inventor: Ke Tang, Beijing (CN)

(73) Assignee: Beijing Funshion Online Technologies Ltd., Beijing (CN)

( * ) Notice: Subject to any disclaimer, the term of this patent is extended or adjusted under 35 U.S.C. 154(b) by 439 days.

(21) Appl. No.: 11/885,011

(22) PCT Filed: Feb. 23, 2006

(86) PCT No.: PCT/CN2006/000259
§ 371 (c)(1),
(2), (4) Date: Dec. 18, 2007

(87) PCT Pub. No.: WO2006/089481
PCT Pub. Date: Aug. 31, 2006

(65) Prior Publication Data
US 2008/0165802 A1 Jul. 10, 2008

(30) Foreign Application Priority Data
Feb. 24, 2005 (CN) .......................... 2005 1 0008871

(51) Int. Cl.
*H04J 3/16* (2006.01)
*H04L 12/42* (2006.01)
(52) U.S. Cl.
USPC .......................................... 370/352; 370/446
(58) Field of Classification Search .................. 370/352, 370/446, 389; 709/227, 229, 245
See application file for complete search history.

(56) References Cited

U.S. PATENT DOCUMENTS

| 7,912,046 B2 * | 3/2011 | Li et al. .......................... 370/389 |
| 2004/0139228 A1 * | 7/2004 | Takeda et al. .................. 709/245 |
| 2006/0075127 A1 * | 4/2006 | Juncker et al. ................. 709/229 |
| 2008/0215669 A1 * | 9/2008 | Gaddy et al. ................... 709/203 |

FOREIGN PATENT DOCUMENTS

| CN | 1514584 A | 7/2004 |
| WO | 2004063843 A2 | 7/2004 |

OTHER PUBLICATIONS

China International Search Report mailed on Jun. 1, 2006.

* cited by examiner

*Primary Examiner* — Thai Hoang
*Assistant Examiner* — Angel Brockman
(74) *Attorney, Agent, or Firm* — Occhiuti Rohlicek & Tsao LLP

(57) ABSTRACT

The present invention discloses a user device for implementing direct penetrating communication between a user device under a NAT and another user device under a different NAT and a method for the same. Detection message is sent to an auxiliary detecting device in an external network through a selected local port. Then the reply message from said auxiliary detecting device will be received and the NAT-translated NAT source port of said detection message can be obtained. By comparing the NAT source ports of a plurality of detection messages, it can be determined whether or not the selected port is a penetrated port. After that, the corresponding NAT source address and NAT penetrated port will be informed to another user device under a different NAT (also, the NAT penetrated port and NAT source port determined by said another user device will be received via said external-network device).

11 Claims, 8 Drawing Sheets ns/METHOD FOR CONTROLLING DIRECT
PENETRATING COMMUNICATION
BETWEEN TWO DEVICES UNDER
DIFFERENT NATS, AND DEVICE FOR THE
SAME

FIELD OF THE INVENTION

The present invention relates to the field of data communication and, more particularly, to a method for controlling mutual communication between users under NATs, which is quite common in an IP communication protocol such as the application field of P2P (Peer to Peer) communication, and a device for the same.

BACKGROUND OF THE INVENTION

The IP communication protocol is widely used for communication in the data communication field, including the Internet, GPRS and CDMA 1x, and respective organizations within a company. Due to its openness, simplicity, low cost and other factors, the IP communication protocol enjoys its support among communication devices and host devices and has hence become a data communication protocol in the most common use.

The current IP communication mode was established according to the IPv4 communication protocol which was formulated by the IETF international organization and which defines an IP address is identified with four bytes. However, the common use of the IP communication protocol in the business area leads to a severe shortage of IP addresses. In this view, the IETF organization has mapped out the NAT technical specification, specifying that reserved addresses can be used as internal private addresses within organizations and enterprises. When users of these addresses need to access other users on the Internet, the function of address translation is performed to translate private addresses into public addresses at the organization or enterprise outbound and by using a NAT device. Either one-to-one translation or multiple-to-one translation (discriminated according to port number) can be implemented. During multiple-to-one translation or multiple-to-multiple (when there are more internal addresses than public addresses) translation (called PAT or NAPT sometimes, but here called NAT for short, because one-to-one NAT has found almost no application field), public addresses are thereby saved. At present, nearly all organizations and enterprises apply NAT (Network Address Translator) technology, wherein private addresses are used within a company and a NAT device is deployed to perform address translation at the outbound of the company to the Internet.

Another purpose of applying NAT technology is to protect internal devices and hosts. Since NAT shields an internal host from being accessed by an external host (unless fixed port mapping from an internal host to external addresses is enabled on NAT, whereas such a case is only that the internal host wishes to provide services to the outside), users within organizations and enterprises are placed in a relatively secure position and are prevented from malicious attack. Such NAT technology is widely used for the firewall policy of companies.

Therefore, the presence of NAT in the IPv4 field saves IP addresses and enhances security. In the IPv6 field, however, since an IP address is identified with six bytes, address saving gets no longer necessary. Firewalls still use NAT technology to protect internal users for the security consideration.

According to the definition of NAT by the IETF, NATs fall into two main categories, i.e. basic NAT (one-to-one address translation) and NAPT (multiple-to-one or majority-to-minority address translation).

In IETF RFC3489 STUN-Simple Traversal of User Datagram Protocol (UDP) Through Network Address Translators (NATs), NAPTs fall into two main categories, i.e. Cone NATs and Symmetric NATs. Cone NATs are characterized in that when an internal host accesses any external address through the same source port, the NAT device uses the same port number after translation and implements port unbinding after a session ends. Symmetric NATs are characterized in that when an internal host accesses any external address and port, the NAT device uses a new port number after translation.

Cone NATs fall into full-duplex Cone NATs, restricted Cone NATs and port-restricted Cone NATs.

A full-duplex Cone NAT will create a public network/private network address when an internal address initiates an "outbound" connection session. Once this address is created, the full-duplex Cone NAT will receive communication transferred to this public port address from any external port.

A restricted Cone NAT screens transferred data packets. When an internal host initiates an "outbound" session, the NAT will record the IP address information of this external host. Therefore, only these recorded external IP addresses can transfer information to the inside of the NAT. Restricted Cone NATs refine the packet screening principle for firewalls effectively, i.e. defines that only known external addresses are allowed to "transfer" information to the inside of NATs.

Different from a restricted Cone NAT, a port-restricted Cone NAT records both the IP address and the port information of an external host. Therefore, only external hosts with recorded IP addresses and port information can transfer information to the inside of the NAT.

For the security consideration, full-duplex Cone NATs and restricted Cone NATs are seldom employed. Only when an internal host wishes to provide services to the outside, will a full-duplex Cone NAT be used to establish one-to-one mapping from the internal server to NAT public network addresses and a particular port.

During applications, a NAT shields internal users from being accessed by external hosts. Therefore, internal users can freely access external hosts through the NAT, whereas external hosts cannot freely access internal users through the NAT. Likewise, internal users under one NAT cannot directly access internal users under another NAT.

This mode is completely feasible in the current application environment with BS (browser/server) and CS (client/server) architecture. However, it is not the same case in the P2P application environment, because besides servers having public network addresses, every user might provide services for other users.

In the prior art, there are two technical solutions that can solve the two problems mentioned above.

The first one is directed at solving the problem of accessing internal users by external users. A certain method is employed to notify an internal user to actively access an external user, and the IP address and port number of this external user is then recorded by a NAT, so that the external user can access internal users through the NAT. In fact, this is a reverse-contact manner, and this notification procedure is implemented by a third-party device. Therefore, all external/internal users establish relations with said third-party device in advance, and the third-party device implements the notification procedure.

The second one is directed at the problem of mutual access between internal users under one NAT and internal users under another NAT. In this technical solution, a third-party device in a public network is employed, and all internal users can freely access this third-party device which serves as a proxy to forward all data messages between any two internal users.

The second solution has an obvious deficiency. That is, it is needed that the third-party device in a public network forwards all traffic, which will cost a huge amount of network resources. As is well known, Cone NATs (hereinafter, unless otherwise indicated, NATs generally mean port-restricted Cone NATs) have a property. That is, when a user uses the same source IP address and port to access hosts at any addresses in an external network during a session, the Cone NAT will use the same NAT external network outbound address and source port to access the hosts in the external network. The present invention has recognized that such a property of Cone NATs can be used to implement direct access between internal users under one NAT and internal users under another NAT without an external third-party proxy.

However, a grave problem arises. That is, most of NAT devices, such as Cisco routers, WinXP, Linux IPTABLE, Wingate, and Sysgate, are usually manifested as Symmetric NATs and exhibit Cone NAT properties only under some particular conditions.

Term Explanation:
NAT: a device used for translation between internal addresses and external addresses. Defined in IETF RFC1631, RFC3022.
Cone NAT: in a session, connection messages sent to different target addresses and ports by using the same port number will be translated by such NAT into messages of the same source port.
Symmetric NAT: connection messages sent to different target addresses and ports by using the same port number will be translated by such NAT into messages of different source ports.
User device: detects a NAT and communicates with user devices under another NAT.
Notifying device: forwards notification messages of user devices under a NAT.
Auxiliary detecting device: replies to a detection message sent by a user device, obtains a NAT external-network address and source port information translated by the NAT, and sends them to a corresponding user device.
NAT penetrated port: a port on a NAT, which is detected by a user device and used for NAT penetrating communication and corresponds to a local penetrated port of an internal-network user device.
Local penetrated port: a local source port which is detected by a user device and used for NAT penetrating communication and corresponds to a NAT penetrated port on a NAT.

SUMMARY OF THE INVENTION

It is an object of the present invention to provide a device for implementing direct penetrating communication between a device under a NAT and other device under a different NAT and a method for the same.

According to a first aspect of the present invention, there is provided a communication method for implementing direct penetrating communication between a user device under a NAT and a user device under a different NAT, comprising the steps of:
selecting a local source port for sending and receiving messages;
obtaining NAT external-network address and NAT port on a NAT, which correspond to said local source port;
notifying a user device under another NAT of said NAT external-network address and NAT port via a notifying device in an external network, and learning NAT external-network address and NAT port of the user device under said another NAT via the notifying device in the external network; and
said user device and the opposite-end user device directly communicating with each other through said local source port and with the received NAT external-network address and NAT port of the other party as a destination address.

According to a second aspect of the present invention, there is provided a method for checking, in a user device under a NAT, whether a selected local source port is a penetrated port or not, comprising the steps of:
selecting a local source port;
sending times of detection messages through said source port and via the NAT to a plurality of destination ports on an external-network auxiliary detecting device or a plurality of external-network auxiliary detecting devices;
receiving a detection reply message from said external-network auxiliary detecting device(s), wherein the content of said detection reply message comprises NAT source address and NAT port on the NAT corresponding to said detection message;
obtaining NAT-translated NAT source address and NAT source port of said detection message;
judging that said local port is a local penetrated port which does not conflict with any port of other device, if NAT source ports of the times of detection messages are the same as one another;
otherwise, re-selecting a different local source port, and repeating the aforesaid steps until a proper port is found.

According to a third aspect of the present invention, there is provided a user device under a NAT, which is for implementing direct penetrating communication with a user device under a different NAT through a specific local port, the user device having a plurality of network ports and further comprising:
a selecting means, for selecting a local source port for sending and receiving messages;
a detecting means, for obtaining NAT external-network address and NAT port on a NAT, which correspond to said local source port;
a port information exchanging means, for notifying another user device under other NAT of said NAT external-network address and NAT port via a notifying device in an external network, and learning NAT external-network address and NAT port of the user device under said another NAT via the notifying device in the external network,
wherein said user device and the opposite-end user device directly communicate with each other through said local source port with the received NAT external-network address and NAT port of the other party as a destination address.

According to a fourth aspect of the present invention, there is provided a method, in an external-network auxiliary detecting device, for helping a user device under a NAT to obtain a NAT port corresponding to its local source port, comprising the step of:
receiving a detection message from said user device;
parsing the received detection message to obtain source address and source port information of the message; and sending the source address and source port information of the parsed message to said user device via a reply message.

According to a fifth aspect of the present invention, there is provided an auxiliary detecting device in an external network for helping a user device under a NAT to obtain a NAT port corresponding to its local source port, comprising:

a message parsing means for parsing a received detection message to obtain source address and source port information of the message; and a sending means for sending the source address and source port information of the parsed message to said user device via a reply message.

Different from the prior art, not all messages are forwarded by an external proxy when the technical solution according to the present invention is employed to solve direct communication between user devices under different NATs.

BRIEF DESCRIPTION ON THE DRAWINGS

The present invention will be described in detail with reference to the accompanying drawings, in which identical reference numerals denote identical or like components:

DESCRIPTION OF THE PREFERRED EMBODIMENTS

Hereinafter, embodiments of the present invention will be described in detail with reference to the accompanying drawings. It should be understood that the present invention is not limited to the embodiments.

Figure 1:
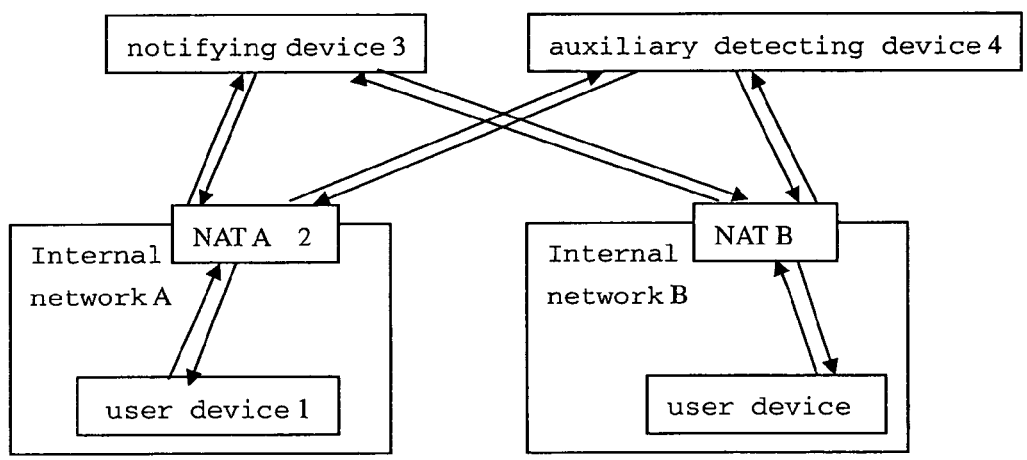
FIG. 1 is a topological layout view in which user devices under different NATs implement direct penetrating communication according to a preferred embodiment of the present invention.

FIG. 1 is a topological layout view in which user devices under different NATs implement direct penetrating communication according to a preferred embodiment of the present invention. Four different kinds of devices are shown in the figure: a user device A1 and a user device B (for the purpose of conciseness, only the reference numeral of user device A1 is given), a NAT A2 and NAT B (for the purpose of conciseness, only the reference numeral of NAT A2 is given), a notifying device 3, and an auxiliary detecting device 4.

NAT A2 performs the address translation function between an internal network and an external network.

User devices A1 and B, which are under NAT A and NAT B respectively, operate under the environment of an internal network. Since notifying device 3 and auxiliary detecting device 4 both operate under the environment of an external network, user devices A1 and B can freely access notifying device 3 and auxiliary detecting device 4.

The technical solution for implementing direct penetrating communication under different NATs according to the present invention comprises four stages, namely a notification setup stage, a detection stage, a notification stage, and a communication setup stage. These four stages will be described in conjunction with FIG. 1 and with reference to FIGS. 2 to 5.

Notification Setup Stage:

Notifying device 3, which is a signaling proxy and signaling processing device, can achieve information sharing between user devices in two modes, namely a synchronous mode and an asynchronous mode.

In the synchronous mode, notifying device 3 has the functions of registering, handshaking and signaling forwarding, which are described as follows:

The function of registering: user devices A1 and B each use a preset unique ID to access and be registered to the notifying device.

The function of handshaking: user devices A1 and B need to maintain their connection with the notifying device, so that notifying device 3 can communicate with the user devices in time. This is because that communication ports on NAT A and NAT B will be aged by the NATs if there is no communication for a long time. An aging time is configurable (usually 1 minute). Therefore, the user device needs to send a handshaking message to the notifying device at regular intervals (usually 30 seconds). This handshaking message has no practical sense, but just to keep the NAT port out of being aged. Notifying device 3 may not reply to this handshaking message but merely maintains the long connection of user devices A1 and B with notifying device 3 via NAT A2 and NAT B respectively. The significance of the long connection is not only that the user device can send messages to notifying device 3 but also that notifying device 3 can send messages to user devices A1 and B.

In the asynchronous mode, the user device is not necessarily required to set up a long connection with notifying device 3. Instead, the user device extracts required information (sent by other device to itself) from notifying device 3 at regular intervals (e.g. several minutes). Notifying device 3 may allocate a storage area for each of the user devices.

User device A1 sends information to notifying device 3 and indicates that the information is actually to be sent to user device B, and then notifying device 3 places the information in the storage area which user device B can access without telling user device B. When user device B accesses the preset storage area on notifying device 3 at regular intervals, it can obtain the information which user device A sends to itself.

Notifying device 3 in the asynchronous mode may employ an e-mail server to achieve the same function.

Detection Stage:

A NAT exhibits Cone NAT properties in a particular situation that when a communication host and a device (user device) in the same internal network access the outside via a NAT, the used NAT source port should not be the same as the NAT source port used by other internal host and device. When the user device uses such a special port to access different external addresses and ports, the NAT employs a port to correspond thereto without opening multiple ports. This is called Cone NAT properties.

Since a user device cannot learn which NAT source ports are used by other users under the same NAT, it cannot learn whether the port used by itself conflicts with the port used by other user device in the same internal network, and further, it cannot obtain the application environment of the Cone NAT in case of a conflict.

Therefore, the user device can keep selecting source ports (source ports of the user device) (among ports whose port numbers are above 2000, because most of ports whose port numbers are below 1024 are occupied by the system) until it can perform normal communication via a source port, in order to judge if it has found a source port having Cone NAT properties (i.e. not to conflict with the port used by other user device under the same NAT). Additionally, the user device can also detect, via an external auxiliary detecting device 4, if the selected source port conflicts with the port used by other user device under the same NAT. Specifically, the user device sends a detection message to auxiliary detecting device 4 through the selected source port and receives a detection reply message from auxiliary detecting device 4, and then judges, via the received detection reply message, if said source port conflicts with the port used by other user device.

Tables 1 and 2 are examples of the respective data structures of the detection message and the detection reply message.

same user device A1 are translated by the NAT into messages which will be sent via multiple NAT source ports (three different ports are shown in the figure).

Figure 3:
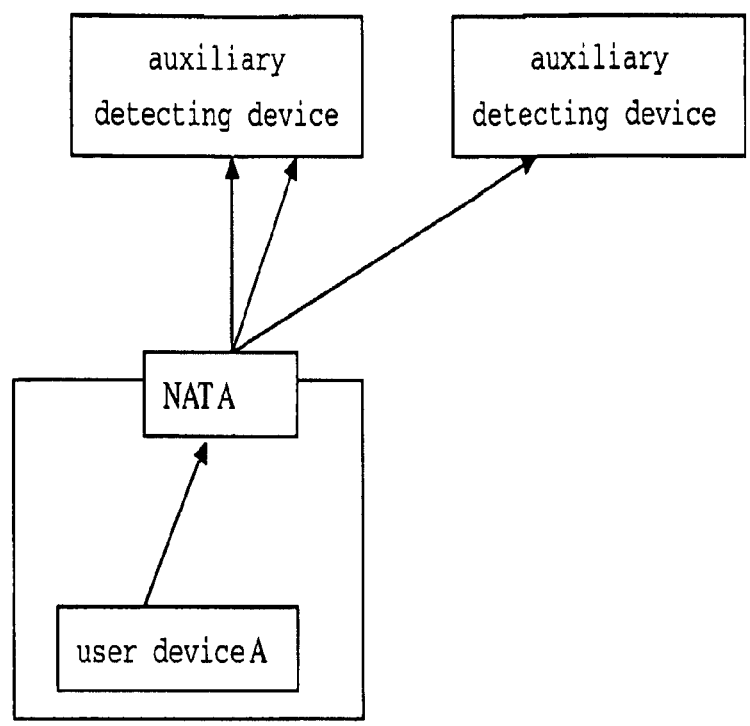
FIG. 3 is a schematic view of a circumstance in which a selected local source port of a user device implement penetrating communication.

FIG. 3 shows a circumstance in which a selected local source port of a user device can implement penetrating communication. Messages of the source port and source address of the same user device are translated by NAT A2 into messages which will be sent via the same NAT source port.

Through the detection procedure, user device A1 can obtain the NAT source port number after NAT translation each time a message is sent. By repeating the detection procedure, user device A1 will find that when messages are sent via a particular user source port, no matter whether they are sent to a port of auxiliary detecting device 4 or to multiple auxiliary detecting devices A and B, they are forwarded by the NAT using the same NAT port. At this point, this user port exhibits Cone NAT properties and can be used as a local penetrated port, and the corresponding NAT port is called NAT penetrated port.

Figure 4:
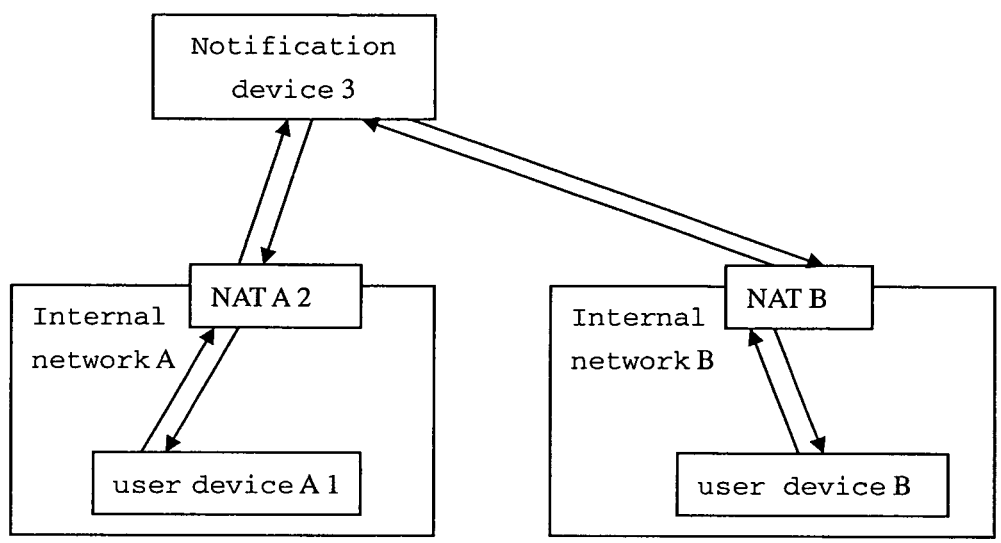
FIG. 4 is a schematic view of a notification stage of a solution in which user devices under different NATs implement direct penetrating communication according to a preferred embodiment of the present invention.

Notification Stage:

FIG. 4 is a schematic view of the notification stage of a solution in which user devices under different NATs implement direct penetrating communication according to a preferred embodiment of the present invention.

Signaling forwarding: when user device A1 needs to notify user device B of its NAT penetrated port, user device A1 sends information to notifying device 3 and indicates that the con-

TABLE 1

Detection Message

| | | Originating detection message | Originating detection message after NAT translation |
|---|---|---|---|
| Message header | Destination address | IP address of auxiliary detecting device | IP address of auxiliary detecting device |
| | Destination port | Port number of auxiliary detecting device | Port number of auxiliary detecting device |
| | Source address | Local host internal-network address | NAT external-network address |
| | Source port | Locally selected port | Port selected by NAT according to predetermined rules |
| Message content | | Local port | Local port |

TABLE 2

Detection reply message

| | | Detection reply message | Detection reply message after NAT translation |
|---|---|---|---|
| Message header | Destination address | NAT external-network address | Local host internal-network address |
| | Destination port | Port selected by NAT according to predetermined rules | Locally selected port |
| | Source address | IP address of auxiliary detecting device | IP address of auxiliary detecting device |
| | Source port | Port number of auxiliary detecting device | Port number of auxiliary detecting device |
| Message content | | Local port NAT external-network address Port selected by NAT according to predetermined rules | Local port NAT external-network address Port selected by NAT according to predetermined rules |

Figure 2:
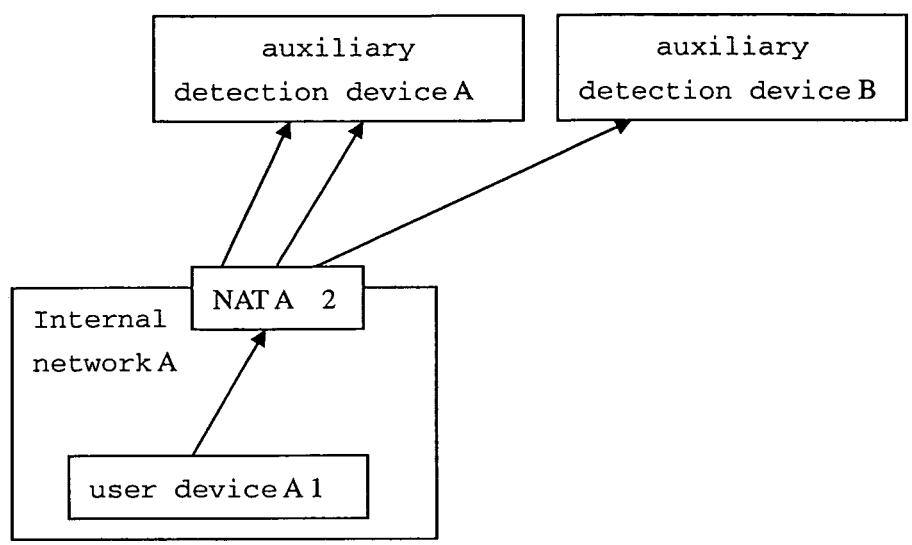
FIG. 2 is a schematic view of a circumstance in which a selected local source port of a user device cannot implement penetrating communication.

FIG. 2 shows a circumstance in which a selected local source port of a user device cannot implement penetrating communication. Due to different destination addresses and ports, messages of the source port and source address of the tent is actually to be sent to user device B. Then, the notifying device encapsulates new IP address and port number to the information and sends the information to user device B afterwards through the long connection port pre-set up with user device B in the synchronous mode. Upon receipt of the message, user device B extracts therefrom the NAT penetrated port of user device A1.

User device B repeats the aforesaid steps so that user device A1 also obtains the NAT penetrated port of user device B.

Figure 5:
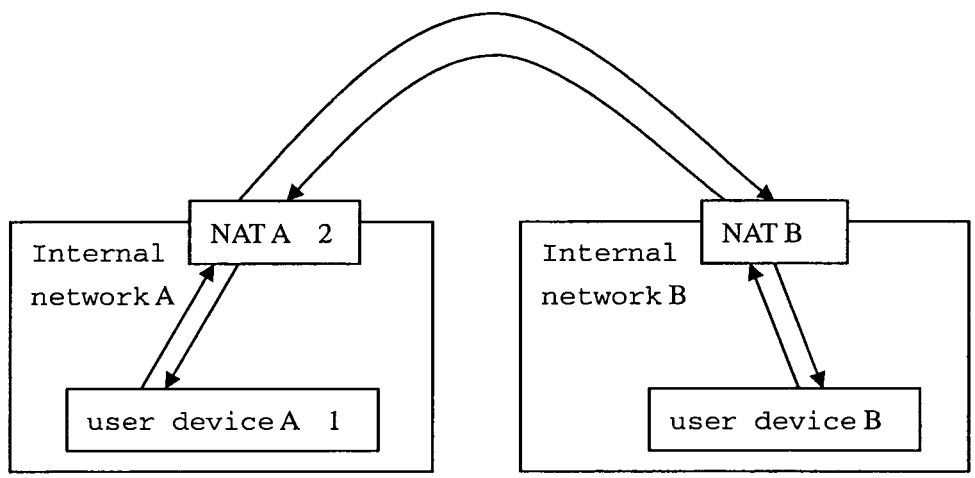
FIG. 5 is a schematic view of a communication setup stage of a solution in which user devices under different NATs can implement direct penetrating communication according to a preferred embodiment of the present invention.

Communication Setup Stage:

FIG. 5 is a schematic view of the communication setup stage of a solution in which user devices under different NATs implement direct penetrating communication according to a preferred embodiment of the present invention.

User device A1 sends to user device B a communication handshaking message which is as shown in Table 3.

TABLE 3

|  |  | Handshaking message of user device A1 | Handshaking message of user device B |
|---|---|---|---|
| Message header | Destination address | NAT B external-network address | NAT A2 external-network address |
|  | Destination port | NAT penetrated port of user device B | NAT penetrated port of user device A1 |
|  | Source address | Local internal-network address of user device A1 | Local internal-network address of user device B |
|  | Source port | Penetrated port of user device A1 | Penetrated port of user device B |
| Message content |  | ACK | ACK |

The message content acknowledges receipts of the message, thereby having no practical sense.

After each of the user devices has successfully received a message, it means that NAT A2 has successfully bound the penetrated port of user device A1 to the NAT penetrated port of user device B, and that NAT B has successfully bound the penetrated port of user device B to the NAT penetrated port of user device A1 (This is a property of port-limited NATs, thereby the prior art).

Each of user devices A1 and B sends a handshaking package using the penetrated source port selected during the detection procedure and with the NAT external-network address and NAT source port of the other party as the destination address and port. Since NAT A2 and NAT B each record the external address and port to which their internal-network user devices A1 and B have originated messages, they judge if a message from an external address and port number is a validated reply message from the other party. If the destination address of a coming message is a NAT address, and the destination port thereof is a NAT penetrated port number which the NAT has allocated to an internal-network user device (such as an internal host or device), but if the source address and port number of this message has not been accessed by a message originated from this NAT penetrated port number for a predetermined time, then the NAT will regard the message as an invalidated message and discard it. However, if hosts and devices under NATs keep sending detection messages to each other for a time, then NATs at the two ends can confirm that a message sent from the other party is a reply message of a message which the present party has sent, whereby these messages will be effectively transferred to the user device of the other party.

Communication Stage:

After the communication setup procedure, user devices A and B under NAT A2 and NAT B respectively can implement direct penetrating communication, i.e. enter the communication stage. FIG. 5 shows a schematic view of the communication stage of a solution in which direct penetrating communication is implemented under different NATs according to a preferred embodiment of the present invention.

User device A1 sends a communication message to the NAT penetrated port and NAT external-network address of user device B, and user device B receives the message sent from user device A1 via its local penetrated port.

User device B sends a communication message to the NAT penetrated port and NAT external-network address of user device A1, and user device A1 receives the message sent from user device B via its local penetrated port.

Detailed contents of the messages sent by user devices A1 and B are as shown in Table 4:

TABLE 4

|  |  | Message sent by user device A1 | Message sent by user device B |
|---|---|---|---|
| Message header | Destination address | NAT B external-network address | NAT A2 external-network address |
|  | Destination port | NAT penetrated port of user device B | NAT penetrated port of user device A1 |
|  | Source address | Local internal-network address of user device A1 | Local internal-network address of user device B |
|  | Source port | Penetrated port of user device A1 | Penetrated port of user device B |
| Message content |  | Payload | Payload | in which the message content is payload.

Figure 6:
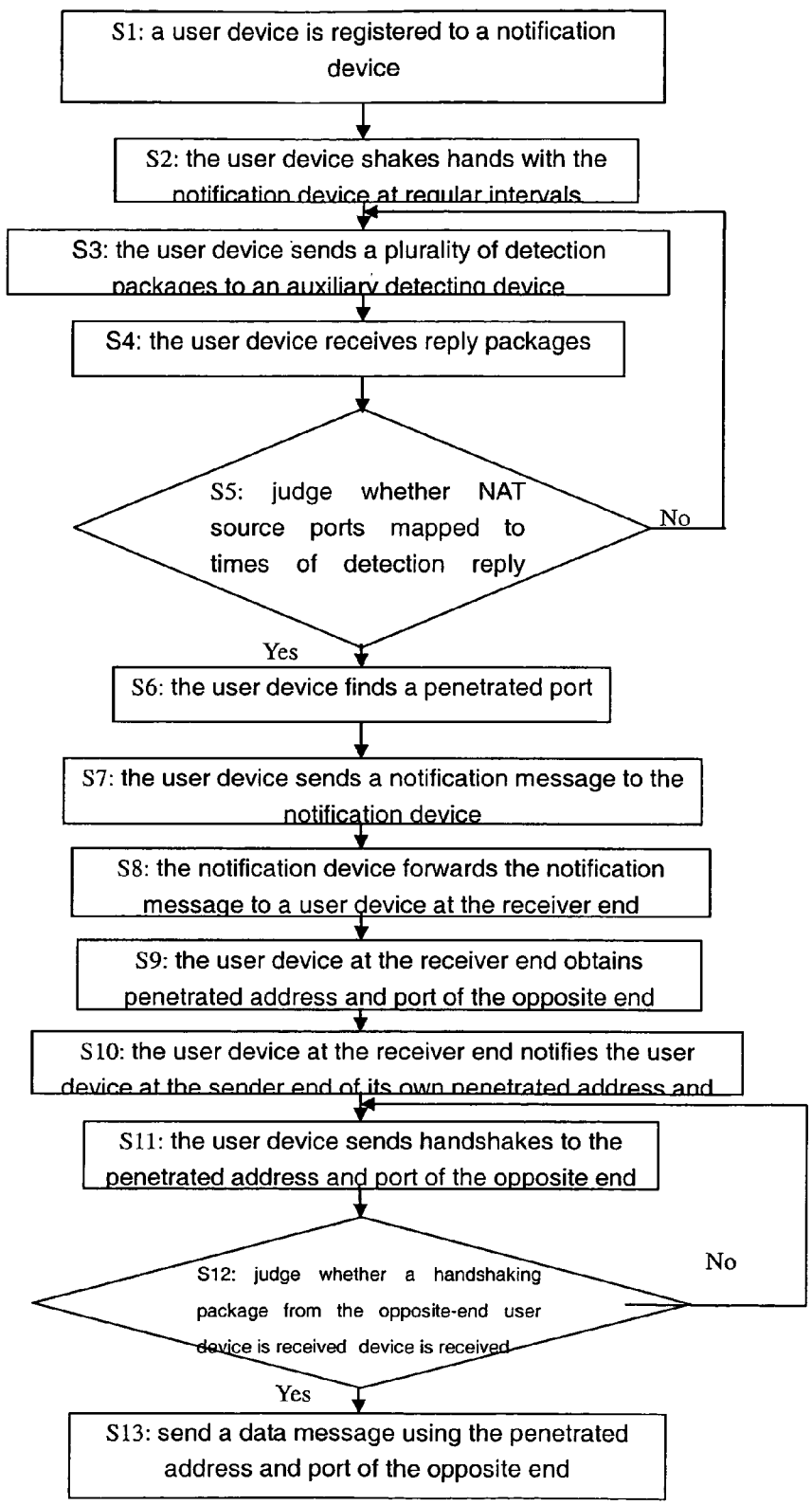
FIG. 6 is a flowchart of a communication method for supporting user devices under different NATs to implement direct penetrating communication according to a preferred embodiment of the present invention.

FIG. 6 is a flowchart of a method for supporting user devices under different NATs to implement direct penetrating communication according to the present invention. The method will be illustrated in detail with reference to FIG. 6.

In step S1, a user device under a NAT is registered to a notifying device in an external network. Each user device has a specific ID, and the notifying device binds this ID to corresponding signaling port and signaling IP address. Afterwards, the flow goes to step S2.

In step S2, the user device under the NAT shakes hands with the notifying device in the external network at regular intervals so as to prevent ports on the NAT from aging (this step is optional, because ports on the NAT will not age in a certain time). Then, the flow goes to step S3.

In step S3, an auxiliary detecting device outside the NAT opens a plurality of ports. The user device under the NAT selects one local source port (usually among ports whose port numbers are above 2000, because most of ports whose port numbers are below 2000 have been occupied by the system) and at the same time, sends a detection message, in which a local source port number is written, to a plurality of destination ports on multiple or one auxiliary detecting device. The NAT translates the message's source address to a NAT external-network address and translates the local source port into a NAT source port selected according to predetermined rules. According to the received NAT-translated source IP address and source port number of the detection message, the auxiliary detecting device writes the source IP address and source port number in the data field of a reply message and sends the reply message to the user device which originated detection. The written destination IP address and destination port number should be NAT port numbers corresponding to the NAT external-network address and the user device which originated detection.

In step S4, the user device under the NAT receives the detection reply message and obtains a NAT port number on the NAT corresponding to the detection message it sent last time.

In step S5, the user device checks and judge whether a selected source port is mapped to the same NAT source port number on the NAT or not when a plurality of detection messages are sent through it. If yes, then the flow goes to step S6, otherwise steps S3 and S4 are repeated.

In step S6, the user device selects this specific local source port as a local penetrated port number for use in sending and reception and notifies other user device of a corresponding NAT penetrated port on the NAT.

Preferably, the user device may send a handshaking message through the local penetrated port to an external device in regular intervals, in order to prevent the port from being aged by the NAT.

In subsequently step S7, the user device under the NAT sends a notification message to the notifying device outside the NAT, which message at least comprises the contents of the sender's ID, the receiver ID, and the sender's NAT address and penetrated port.

In step S8, upon receipt of the notification message, the notifying device parses the message contents, queries corresponding signaling port and signaling IP address according to the receiver's ID, and sends the message to a corresponding user device at the receiver after re-encapsulating it.

In step S9, upon receipt of the notification message, the receiver user device obtains the NAT address and NAT penetrated port of the other party.

In step S10, a receiver host also sends a notification message to the other party. Then, steps S7 to S9 are repeated until both parties obtain the NAT address and penetrated port of the other party.

In step S11, each of the user devices under the two NATs can send a handshaking package through a predetermined local penetrated port to the other party with the NAT external-network address and port of the other party as the destination address and port.

In step S12, the user device judges whether the handshaking package has been received or not. If yes, it means that communication can be implemented using the penetrated port; if not, then step S11 is repeated (because handshaking packages might be lost in an actual network environment, which is not an essential technical feature).

In step S13, once the handshake is set up, the user devices under two different NATs can freely communicate with each other through a preset source port. Only trough the preset port, can the communication be implemented.

Figure 7:
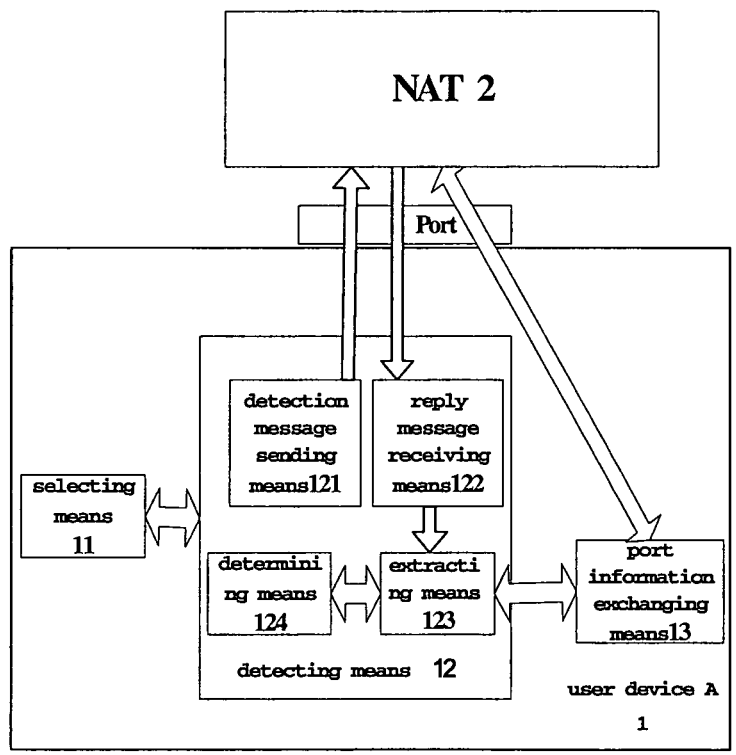
FIG. 7 is a block diagram of a user device under NAT for implementing direct penetrating communication with other user device under a different NAT according to a preferred embodiment of the present invention.

FIG. 7 shows a block diagram of a user device under a NAT for implementing direct penetrating communication with other user device under a different NAT according to a preferred embodiment of the present invention.

Wherein, said user device A1 comprises:
a selecting means 11 for selecting a local source port to send and receive messages;
a detecting means 12 for obtaining NAT source address and NAT port on the NAT corresponding to said local source port;
a port information exchanging means 13 for notifying another user device under other NAT of said NAT source address and NAT port via a notifying device in an external network, and learning the NAT source address and NAT port of the user device under said other NAT via the notifying device in the external network,
wherein, through said local source port, said user device and the opposite-end user device directly communicate with each other with the received NAT source address and NAT port of the other party as a destination address.

In a preferred embodiment, detecting means 12 comprises:
detection message sending means 121 for sending a detection message through said local source port and via the NAT to an auxiliary detecting device in an external network;
reply message receiving means 122 for receiving a reply message from the auxiliary detecting device in said external network, wherein said reply message comprises the NAT-translated NAT source address and NAT source port of said detection message; and
extracting means 123 for extracting the NAT-translated NAT source address and NAT source port of said detection message from said reply message.

Preferably, if said use device cannot communicate normally for a defined time, then said selecting means re-selects a different local source port; said detecting means is for re-obtaining NAT source address and NAT port on the NAT corresponding to said re-selected local source port.

In another preferred embodiment, detecting means 12 comprises:
detection message sending means 121 for sending times of detection messages to a plurality of destination ports on an external-network auxiliary detecting device or to a plurality of external network auxiliary detecting devices through the selected local source port and via the NAT;
reply message receiving means 122 for receiving a plurality of reply messages from said external-network auxiliary detecting device(s), wherein the content of each of said reply messages comprises the NAT-translated NAT source address and NAT port corresponding to a detection message;
extracting means 123 for extracting the NAT-translated NAT source address and NAT source port of said detection message from said reply message; and
determining means 124 for, if the NAT source ports of said times of detection messages are the same as one another, determining said local port as a local penetrated local which does not conflict with the port of other device and selecting said NAT source address and NAT port as the ultimate NAT external-network address and NAT port. Otherwise, selecting means re-selects a different local source port, and detecting means 12 sends times of detection messages to judge whether or not the local source port is a local penetrated port which does not conflict with the port of other device.

Port information exchanging means 14 notifies the another user device under the different NAT of the ultimately determined NAT penetrated port information via the notifying device in the external network and learns the NAT source address and NAT penetrated port of said another user device, so that communication can be implemented through the local penetrated port with the NAT source address and NAT penetrated port of the other party as destination address and destination port.

Figure 8:
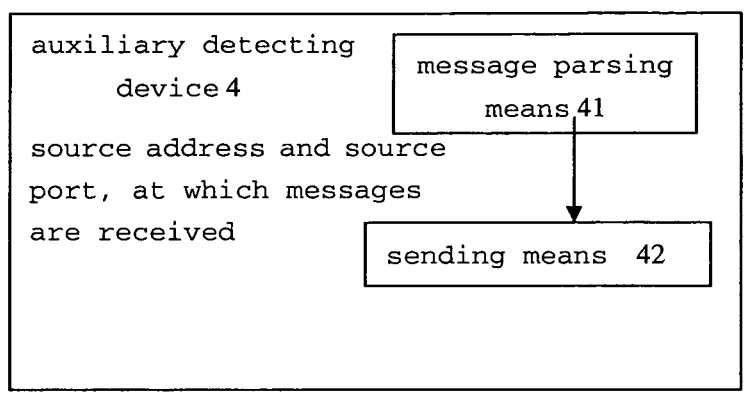
FIG. 8 is a block diagram of an auxiliary detecting device according to a preferred embodiment of the present invention.

FIG. 8 shows a block diagram of an auxiliary detecting device according to a preferred embodiment of the present invention. Said auxiliary detecting device, which is located at an external network, is for helping a user device under a NAT to obtain a NAT port corresponding to its local source port. Auxiliary detecting device 4 comprises:
message parsing means 41 for parsing a received detection message to obtained the source address and source port information of the message; and
sending means 42 for sending the source address and source port information of the parsed message to said user device via a reply message.

For the purpose of conciseness, terms such as internal network, public network, internal address, and public address have been involved in the context. However, the present invention is not limited to the field of internal and public networks and applies to any NAT application field, for example, where there are multiple levels of NATs within an enterprise and user devices of two organizations are under different NATs.

The present invention preferably applies to communication over UDP.

The present invention is not suitable for full Symmetric NATs. However, most of commercial NATs employ a mixed mode and are manifested as Symmetric NATs in most occasions and as Cone NATs in special occasions.

The embodiments of the present invention have been described above. It is to be understood that the present application is not limited to the specific embodiments described previously, and various modifications or alterations can be made by those skilled in the art within the scope of the appended claims.

What is claimed is:

1. A communication method for implementing direct penetrating communication between a first user device under a first NAT and a second user device under a second NAT different from the first NAT, the method comprising: a) selecting, in the first user device, a local port for sending and receiving messages; b) sending, in the first user device, times of detection messages through the selected local source port and via the first NAT to a plurality of destination ports of at least one auxiliary detecting device in an external network; c) receiving, in the first user device, a plurality of reply messages from the at least one auxiliary detecting device, wherein each reply message comprises an NAT-translated NAT source address and an NAT source port of one of the detection messages respectively corresponding to one of the received reply messages; d) extracting, in the first user device, the respective NAT-translated NAT source address and the NAT source port of each one of the detection messages from the corresponding one of the reply messages; e) determining, in the first user device, whether the respective NAT source ports of the times of the detection messages are the same as one another, and if so, determining that the selected local source port is a proper local penetrated port that does not conflict with any port of another device, and using the extracted NAT-translated source address and NAT source port as a selected NAT external-network address and an NAT source port, respectively; f) if the first user device does not determine that the selected local source port is a proper local penetrated port in step e), re-selecting a different local source port and repeating steps a) through e) until a proper local penetrated port is found; g) notifying, in the first user device via a notifying device in an external network, the second user device under the second NAT of the NAT external-network address and the NAT source port selected in step e), and receiving an NAT external-network address and an NAT port of the second user device via the notifying device in the external network, wherein the NAT port of the second user device is the NAT penetrated port of the second device; and h) in the first user device, communicating directly with the second user device through the proper local penetrated port and the received NAT external-network address and NAT penetrated port of the second user device as a destination address.

2. The method according to claim 1, wherein the first user device selects a plurality of local source ports at the same time, and performs steps a) to f) for each of the selected local source ports so as to determine in a shorter time a local source port from among the plurality of selected local source ports through which communication can be implemented.

3. The method according to claim 2, wherein the proper local penetrated port is a port-restricted local penetrated port, and wherein, after step g) and before step h), the method further comprises: through the proper local penetrated port, sending a first handshake packet to the second user device by using the NAT external-network address and the NAT port of the second user device as the destination address and destination port of the first handshake packer, respectively; and receiving a second handshake packet sent by the second user device in which the NAT external-network address and the NAT port of the first user device are used as the destination address and destination port of the second handshake packet, respectively, and wherein step h) further comprises, when the first and second handshakes are exchanged, the first user device and the second user directly communicate with each other through the proper local penetrated port.

4. The method according to claim 1, wherein the proper local penetrated port is a port-restricted local penetrated port, and wherein, after step g) and before step h), the method further comprises: through the proper local penetrated port, sending a first handshake packet to the second user device by using the NAT external-network address and NAT port of the second user device as the destination address and destination port of the first handshake packet, respectively; and receiving a second handshake packet sent by the second user device in which the NAT external-network address and NAT port of the first user device are used as the destination address and destination port of the second handshake packet, respectively, and wherein step h) further comprises, when the first and second handshakes are exchanged, the first user device and the second user directly communicate with each other through the proper local penetrated port.

5. A method according to claim 1, wherein step b) comprises sending times of the detection message through the selected local source port and via the first NAT to a plurality of destination ports of a plurality of auxiliary detecting devices in the external network.

6. A method for determining, in a first user device under a first NAT, whether a selected local source port is a local penetrated port, the method comprising the steps of: a) selecting, in the first user device, a local source port; b) sending, in the first user device, times of detection messages through the selected local source port and via the first NAT to a plurality of destination ports of at least one auxiliary detecting device in an external network; c) receiving, in the first user device, a plurality of detection reply messages from the at least one auxiliary detecting device in the external network, wherein each detection reply message comprises an NAT source address and an NAT port that correspond to the detection message of the first NAT; d) obtaining, in the first user device, an NAT-translated NAT source address and an NAT source port of the received detection message; e) determining, in the first user device, whether the NAT source ports of the times of the detection messages are the same as one another, and if so, determining that the selected local source port is a proper local penetrated port that does not conflict with any port of another device; and f) if the first user device does not determine that the selected local source port is a proper local penetrated port in step e), re-selecting a different local source port and repeating steps a) through e) until a proper local penetrated port is found.

7. The method according to claim 6, wherein the first user device simultaneously selects a plurality of local source ports to originate detection, and all of said steps a) through f) are performed for each selected local source ports to determine whether each selected local source port is a proper local penetrated port.

8. A first user device under a first NAT and configured to implement direct penetrating communication with a second user device under a second NAT different than the first NAT, through a specific local port, the first user device having a plurality of network ports, the first user device comprising: a selecting means for selecting a local source port for sending and receiving messages; a detecting means for obtaining an NAT source address and an NAT port that correspond to the selected local source port of an NAT, the detecting means comprising: a detection message sending means for sending times of detection messages through the selected local source port and via the first NAT to a plurality of destination ports of at least one auxiliary detecting device in an external network; a replay message receiving means for receiving a plurality of reply message from the at least one auxiliary detecting device, wherein each reply message comprises an NAT-translated NAT source address and an NAT source port of one of the detection messages respectively corresponding to one of the received reply messages; an extracting means for extracting the respective NAT-translated NAT source address and the NAT source port of each one of the detection messages from the corresponding one of the reply messages; and a determining means for determining whether the NAT source ports of the times of the detection messages are the same as one another, and if so, determining that the selected local source port is a proper local penetrated port that does not conflict with any port of another device, and selecting the NAT-translated source address and the NAT source port as an ultimate NAT external-network address and NAT port; wherein the first user device further comprises a port information exchanging means for notifying, via a notifying device in an external network, the second user device under the second NAT of the ultimate NAT external-network address and NAT source port selected by the determining means, and receiving an NAT external-network address and an NAT port of the second user device via the notifying device in the external network; and wherein the first and second user devices communicate directly with each other through the proper local penetrated port and the received NAT external-network address and NAT port of the second user device as a destination address.

9. The first user device according to claim 8, wherein said selecting means simultaneously selects a plurality of local source ports, and each of said means comprised in said detecting means performs its corresponding function for the plurality of local source ports.

10. The first user device according to claim 9, wherein: the proper local penetrated port is a port-restricted local penetrated port; the first user device is further configured to send a handshake packet to the second user device by using the selected NAT external-network address and NAT port as the destination address and the destination port, respectively, and receive a handshake packet sent by second user device in which the selected NAT external-network address and the NAT port of the first user device are used as the destination address and the destination port, respectively; and upon reception of the handshake packet by the first user device, the first user device and the second user device are configured to communicate directly with each other through the proper local penetrated port.

11. The first user device according to claim 8, wherein: the proper local penetrated port is a port-restricted local penetrated ports; the first user device is further configured to send a handshake packet to the second user device by using the selected NAT external-network address and NAT port as the destination address and the destination port, respectively, and receive a handshake packet sent by the second user device in which the selected NAT external-network address and the NAT port of the first user device are used as the destination address and the destination port, respectively; and upon reception of the handshake packet by the first user device, the first user device and the second user device are configured to communicate directly with each other through the proper local penetrated port.

* * * * *